Patented June 13, 1950

2,511,163

UNITED STATES PATENT OFFICE 2,511,163

N-RICINOLEYL AMINES AND METHOD FOR THE PRODUCTION THEREOF

Arthur L. Jacoby, Western Springs, Ill., assignor to National Aluminate Corporation, Chicago, Ill., a corporation of Delaware No Drawing. Application May 31, 1946, Serial No. 673,599

6 Claims. (Cl. 260—404.5)

This invention relates to N-ricinoleyl amines, more particularly di-(N-ricinoleyl) polyalkylene polyamines, and a preferred procedure for their preparation. More specifically it relates to the product of the condensation of two moles of ricinoleic acid and one mole of triethylene tetramine, and to a particular method of producing it in satisfactory yield from commercial ricinoleic acid or, as it is frequently referred to, castor fatty acid.

The present application is a continuation-in-part of copending application Serial No. 436,489, filed March 27, 1942.

When ricinoleic acid stands in storage, a change takes place whereby the apparent acid content decreases, although the saponification value will remain the same. This change is apparently due to an inter- or intraesterification, in which the carboxyl group of the acid reacts with the alcoholic hydroxyl group of the same or an adjacent molecule. It is not uncommon to find as much as one-third of the acid thus altered.

If such ricinoleic acid is used for the condensation with a polyamine, e. g., triethylene tetramine, and no additional quantity is employed to correct for the loss due to this esterification or aging, the yield of desired product is correspondingly lessened. Since all commercially available castor fatty acid is subject to this change in aging, it is desirable to employ a procedure in which it can be used in theoretical quantity based on its original fatty acid content at the time it was freshly made.

One of the objects of this invention is to provide a new and improved method of making N-ricinoleyl amines.

Another object of the invention is to provide a new and improved method of making di(N-ricinoleyl) polyalkylene polyamines.

Another object of the invention is to produce new and useful compositions of matter.

Still a further object of the invention is to produce new compositions of matter having improved antifoam characteristics. Other objects will appear hereinafter.

In accordance with this invention, I have found it possible to saponify the inter- or intraester of ricinoleic acid rapidly and, apparently, completely, without the employment of undesirable catalysts which would appear in the finished product. Moreover, this saponification can be conducted under conditions whereby the desired acylation reaction is simultaneously carried out, so that only one reaction vessel need be used for the entire process. This novel procedure consists in first heating the ricinoleic acid material and an amine, e. g., triethylene tetramine, together in the presence of water under superatmospheric pressure conditions and correspondingly high temperatures. By this procedure, the inter- or intraester is smoothly and efficiently saponified. The water is employed in excess, which contributes to the completeness of the conversion, and the alkalinity provided by the amine undoubtedly exerts a catalytic action, promoting the saponification.

The presence of an excess of water is desirable to effect saponification. The removal of water is necessary to promote the acylation. These apparent incompatible conditions are met by heating the mixture of ricinoleic acid, amine, and water under pressure for a period of time sufficient substantially to complete the saponification, and then gradually lowering the pressure by permitting the escape of steam until atmospheric pressure is reached, after which time the acylation reaction may be further completed if found necessary by an additional period of heating at atmospheric pressure under conditions permitting the free escape of water vapor.

The following example will further describe the preferred method of preparing the material of this invention.

*Example*

Into a reaction vessel of about 21 gallons capacity, consisting of a vertically arranged cylindrical tank, diameter 16 inches, side sheet 24 inches, was placed 77.5 pounds of castor fatty acid. On the basis of the ricinoleic acid content at the time this material was freshly prepared, this quantity represented 0.26 pound-mole. Actually, titration indicated that, because of aging, the material contained only some 66% free ricinoleic acid. To the kettle was next added 19 pounds of triethylene tetramine (0.13 pound-mole) and 3.1 pounds of water (0.17 pound-mole or a 100% excess over that theoretically required to reconvert the inter- or intraester of the fatty acid).

The reaction vessel was then closed tightly by means of the upper valves, and heated by means of a steam jacket carrying steam at 110 p. s. i. gauge (173° C.). The reaction mixture was agitated mechanically by means of a stirrer operated through a stuffing box. In about 75 minutes, the autogenous pressure inside the reaction vessel had reached 90–95 p. s. i. and after 90 minutes this pressure was gradually dropped by permitting steam to bleed off through a needle valve leading from the top of the vessel. The pressure reached atmospheric during a "bleeding" interval of 70 minutes. The rate of bleeding was the maximum which could be used without entraining substantial amounts of the reaction mixture in the steam and thereby decreasing the yield. Although tests of the material removed from the reactor at the end of the bleeding period indicate that the yield at this stage is good, it is generally considered safer practice, to insure maximum yield, to maintain the mixture under the temperature conditions above mentioned for an additional period, say 30 minutes. Obviously, the above described conditions, particularly the length of the time intervals, could be varied and would be influenced by the size of the batch and size of reactor. In general, it can be said that the initial saponification period should be long enough to permit the pressure of the reaction vessel nearly to equal the equilibrium pressure of steam at the temperature employed. The length of the bleeding period will be determined largely by the free-board in the vessel, since it is desired to bleed as rapidly as possible without losing valuable material by entrainment. The final reaction period under atmospheric pressure conditions will be determined by the size of the batch, the temperature of the batch, and the extent of acylation accomplished in the bleeding period.

The product obtained by this method is, when cool, a soft brown grease. The refractive index, taken at 50° C., is approximately 1.4900 or a little lower. Determination of the amide value and the free acid in the product indicates that the di(N-ricinoleyl) triethylene tetramine constitutes approximately 90% or more of the material.

When this material is purified by means of repeated recrystallizations of the hydrochloride from ethanol containing a little free hydrogen chloride, a colorless crystalline hydrochloride is obtained of M. P. 217–217.5° C. When this purified hydrochloride is reconverted to the non-salt form, the resulting di(N-ricinoleyl) triethylene tetramine is a soft wax of pale yellow color. Calculated for $C_{42}H_{82}O_4N_4$: N=7.92%: found N=7.52 and 7.55%.

In order to demonstrate clearly the substantial difference in yield obtainable through the employment of the preliminary high pressure-high temperature hydrolysis over that obtainable by merely heating the reactants together at atmospheric pressure, the following data is presented.

Condensation products of the type described in the example are useful as an antiform agent for a variety of applications, among which may be named the reduction of foaming in the making of paper, and the reduction of foaming and priming, with the resultant improvement in steam quality, superheat temperature, and blowdown requirement, in boilers for the production of steam.

The reaction of two moles of castor fatty acid (based on free acid content of the freshly prepared material) and one mole of triethylene tetramine was carried out under various conditions of pressure, at a temperature of 150–170° C. The resulting products were tested for antifoam efficiency in a laboratory boiler of the type described in the publication: "Solid Matter in Boiler Water Foaming," Foulk and Brill, Ind. Eng. Chem., 27 1430–35 (1935), using in each test the same boiler pressure, viz., 250 p. s. i., and the same feedwater and water-treating agents, i. e., soda ash, chestnut extract, etc. The results of these tests, expressed as concentration of dissolved solids in the boiler water at the time of carryover, are given in the following table:

| Material | Pressure employed in synthesis p. s. i. gauge | Dissolved solids g. p. g. |
| --- | --- | --- |
| 1 | 0 | 624 |
| 2 | 30–40 | 504 |
| 3 | 40 | 564 |
| 4 | 60 | 1,146 |

These data show that it is desirable to use a minimum pressure of about 60 p. s. i. gauge in the hydrolysis step, since the products so prepared showed an efficiency by this method of testing of about double that of the materials prepared at 40 p. s. i. or less. The autogenous pressure will be higher at higher temperatures. Good results have been obtained in commercial practice at pressures of 115–120 p. s. i. gauge and the corresponding temperatures.

A study of a large series of diacylated polyalkylene polyamines has shown that for a compound of this type to be of greatest efficiency as an antiform, it is necessary that a certain relation be established between the hydrophilic nature of the central polyamine grouping and the relatively hydrophobic nature of the long acyl chains. It has been found that where the acyl groups are derived from ricinoleic acid, that the condensation of two moles of ricinoleic acid and one mole of triethylene tetramine gives a product of antifoam properties superior to the products made in an analogous manner from either diethylene triamine or tetraethylenepentamine, respectively.

The general procedure described herein is applicable to the preparation of other N-ricinoleyl amines. In every case the procedure involves four steps, namely, (1) a heating period in which the inter- or intraester or ricinoleic acid is first heated with an amine and water in a closed vessel until the autogenous pressure is at least 60 p. s. i. gauge; (2) the reaction mixture is held under said superatmospheric pressure until hydrolysis is substantially complete which will require say one hour for a one ton batch; (3) the water is bled off in the form of steam by releasing the pressure which may require a substantial length of time, say 80 to 90 minutes in the case of a one ton batch, and (4) the reaction mixture is held at a temperature preferably above about 150° C. for a substantial period of time, say about 6 to 8 hours in the case of a one ton batch. The temperature during the fourth or holding period should be insufficiently high to bring about further undesirable dehydration reactions. Temperatures as high as 200° C. may be used for short periods of time but usually it is preferable to hold the reaction mixture within the range of 150–170° C. in the fourth step.

While the invention has been described specifically with respect to compositions in which the amine is a polyalkylene polyamine, e. g., diethylene tetramine, triethylene tetramine and tetraethylenepentamine, other amines can be used, e. g., decamethylene diamine, octamethylene diamine, octadecylamine, hexadecylamine, dodecylamine, mixtures of octadecylamine, hexadecylamine, dodecylamine, mixtures of octadecyl-, hexadecyl-, and octadecenylamines, and mixtures containing octadecadienylamine, aromatic amines, e. g., aniline, ethylaniline, alpha-naphthylamine, metaphenylene, diamine, orthophenylene diamine and paraphenylene diamine. An inherent characteristic of these amines is the presence of at least one replaceable hydrogen atom attached to a nitrogen atom of an amino group.

The invention is especially advantageous in providing new and useful compositions of matter and in providing a new and improved general method of making N-ricinoleyl amines from raw materials containing inter- and intraesters of ricinoleic acid. One important advantage lies in the fact that the hydrolysis and acylation reactions can be carried out in the same reaction vessel and that the amines which are acylated actually assist in conditioning the ricinoleic acid material for the acylation reaction.

Having thus described this invention, what I claim as new and desire to secure by Letters Patent of the United States is:

1. In a process of preparing an N-ricinoleyl amine, the step which comprises heating a ricinoleic acid containing inter- and intraesters of ricinoleic acid with water and an amine having a replaceable hydrogen atom attached to a nitrogen atom of an amino group at temperatures within the range of 150° C. to 200° C. under superatmospheric pressures of at least 60 pounds per square inch and under conditions substantially preventing the removal of water from the reaction mixture until said esters are substantially hydrolyzed.

2. In a process of preparing an N-ricinoleyl amine, the step which comprises heating a ricinoleic acid containing inter- and intraesters or ricinoleic acid with water and an amine having a replaceable hydrogen atom attached to a nitrogen atom of an amino group at temperatures within the range of 150° C. to 200° C. under superatmospheric pressures of at least 60 pounds per square inch and under conditions substantially preventing the removal of water from the reaction mixture until said esters are substantially hydrolyzed, said amine having a boiling point sufficiently high to be retained in said reaction mixture when said superatmospheric pressure is reduced to atmospheric pressure.

3. In a process of preparing an N-ricinoleyl amine, the step which comprises heating a ricinoleic acid containing inter- and intraesters of ricinoleic acid with water and an amine having a replaceable hydrogen atom attached to a nitrogen atom of an amino group at temperatures within the range of 150° C. to 200° C. under superatmospheric pressures of at least 60 pounds per square inch and under conditions substantially preventing the removal of water from the reaction mixture until said esters are substantially hydrolyzed, said amine having a boiling point sufficiently high to be retained in said reaction mixture when said superatmospheric pressure is reduced to atmospheric pressure, releasing said pressure to volatilize and remove said water from the reaction mixture, and continuing to maintain said temperature within the range of 150° C. to 200° C. for a period of time sufficiently long to complete the acylation of said amine.

4. A process of preparing a di-N-ricinoleyl polyalkylenepolyamine which consists essentially in heating a ricinoleic acid containing inter- and intraesters of ricinoleic acid with water and a polyalkylenepolyamine at a temperature of 150° C. to 170° C. and at least the corresponding autogenous pressure, whereby the esters are substantially hydrolyzed and acylation occurs, and subsequently removing the water from the reaction mixture by permitting the pressure to drop to atmospheric pressure while maintaining the reaction mixture in the same temperature range, said ricinoleic acid and polyamine being employed in a mole ratio of approximately 2 to 1, the molecular weight of the acid being based on its saponification value.

5. A process of preparing di(N-ricinoleyl) triethylene tetramine which comprises heating a ricinoleic acid containing inter- and intraesters of ricinoleic acid with water and triethylene tetramine under superatmospheric pressure of at least about 60 p. s. i. and at temperatures above about 150° C. under conditions preventing the removal of water from the reaction mixture until said esters are substantially hydrolyzed, releasing said pressure under conditions effective to volatilize and remove said water from the reaction mixture, and heating the resultant reaction mixture to temperatures within the range of about 150° C. to about 170° C. for a period of time sufficiently long to substantially complete the acylation of said amine, the proportions of said amine corresponding to approximately one mole for every two moles of ricinoleyl groups in said ricinoleic acid material containing inter- and intraesters of ricinoleic acids.

6. The product obtained by reacting a ricinoleic acid material containing inter- and intraesters of ricinoleic acid and triethylene tetramine in the presence of water under an autogenous superatmospheric pressure of at least 60 p. s. i. and the corresponding temperatures, the quantity of said amine corresponding to approximately one mole for every two ricinoleyl moles, removing the water by releasing said superatmospheric pressure, and continuing the heating of the resultant reaction mixture at temperatures within the range of about 150° C. to about 170° C. until the resultant product is composed principally of di(N-ricinoleyl) triethylene tetramine.

ARTHUR L. JACOBY.

REFERENCES CITED

The following references are of record in the file of this patent:

UNITED STATES PATENTS

| Number | Name | Date |
|---|---|---|
| 2,146,201 | Coltof | Feb. 7, 1939 |
| 2,201,041 | Katz | May 14, 1940 |
| 2,225,189 | Wayne | Dec. 17, 1940 |
| 2,243,980 | Rheiner et al. | June 3, 1941 |
| 2,291,396 | Lieber | July 28, 1942 |
| 2,322,240 | Kropa | June 22, 1943 |

OTHER REFERENCES

"Marine Animal Oils," by Brocklesby, Bulletin Number LIX, Fisheries Research Board of Canada (1941), pages 107 and 282.

Certificate of Correction

Patent No. 2,511,163                                              June 13, 1950

ARTHUR L. JACOBY

It is hereby certified that error appears in the printed specification of the above numbered patent requiring correction as follows:

Column 5, line 36, for the word "or" after "intraesters" read *of*;

and that the said Letters Patent should be read with this correction therein that the same may conform to the record of the case in the Patent Office.

Signed and sealed this 12th day of September, A. D. 1950.

[SEAL]

THOMAS F. MURPHY,
                                                           *Assistant Commissioner of Patents.*